(12) United States Patent
Haserodt et al.

(10) Patent No.: US 9,344,460 B2
(45) Date of Patent: May 17, 2016

(54) HIGH AVAILABILITY SESSION RECONSTRUCTION

(75) Inventors: Kurt Haserodt, Westminster, CO (US); Thorsten Ohrstrom-Sandgren, Thornton, CO (US); Joel Ezell, Broomfield, CO (US); Don Gillespie, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 575 days.

(21) Appl. No.: 13/570,528

(22) Filed: Aug. 9, 2012

(65) Prior Publication Data

US 2014/0047122 A1    Feb. 13, 2014

(51) Int. Cl.
G06F 15/16     (2006.01)
H04L 29/06     (2006.01)
H04L 29/14     (2006.01)

(52) U.S. Cl.
CPC ........ *H04L 65/1069* (2013.01); *H04L 65/1006* (2013.01); *H04L 69/40* (2013.01)

(58) Field of Classification Search
CPC ..................................................... H04L 69/40
USPC ................................. 709/228, 227; 370/225
See application file for complete search history.

(56) References Cited

U.S. PATENT DOCUMENTS

| 6,992,974 | B1 * | 1/2006 | Tripathi .................... 370/216 |
| 7,916,855 | B2 * | 3/2011 | Caballero-McCann et al. ............ 379/221.04 |
| 8,179,912 | B2 * | 5/2012 | Cosmadopoulos et al. .. 370/449 |
| 2006/0036747 | A1 | 2/2006 | Galvin, Jr. et al. |
| 2007/0281681 | A1 * | 12/2007 | Holm ................ 455/422.1 |
| 2008/0013447 | A1 * | 1/2008 | Lauber .................... 370/225 |
| 2008/0137531 | A1 | 6/2008 | Tal-Aviv et al. |
| 2008/0155310 | A1 * | 6/2008 | Langen et al. .............. 714/6 |
| 2011/0320525 | A1 * | 12/2011 | Agarwal et al. ........... 709/203 |

FOREIGN PATENT DOCUMENTS

| EP | 2667563 | 11/2013 |
| EP | 2680525 | 1/2014 |

OTHER PUBLICATIONS

Kistijantoro et al. "Component Replication in Distributed Systems: a Case study using Enterprise Java Beans," Proceedings of the 22nd International Symposium on Reliable Distributed Systems, Oct. 2003, pp. 89-98, obtained from [citeseerx.ist.psu.edu/viewdoc/download?doi=10.1.1.2.530&rep=rep1&type=pdf].
Search Report for United Kingdom Patent Application No. GB1311098.6, dated Dec. 16, 2013 8 pages.

(Continued)

*Primary Examiner* — David Lazaro
*Assistant Examiner* — Marie Georges Henry
(74) *Attorney, Agent, or Firm* — Sheridan Ross P.C.

(57) ABSTRACT

A first message is received at a primary container that is replicated by a secondary container. The first message is an initial message to initiate a first session. The first message is processed by an application in the primary container. At a point in time, the primary container is unavailable and the system and method detect that the primary container is unavailable. A second message is received. The second message is associated with the first session. The second message is modified by moving at least a portion of a header in the second message into a different header in the second message and adding an additional header to the second message in response to the primary container being unavailable.

20 Claims, 7 Drawing Sheets

(56) References Cited

OTHER PUBLICATIONS

Official Action with English Translation for Korea Patent Application No. 2013-0075603, dated Jun. 2, 2014 4 pages.
Search and Examination Report for United Kingdom Patent Application No. GB1311098.6, dated Nov. 3, 2014, 5 pages.
Notice of Allowance with English Translation for Korea Patent Application No. 2013-0075603, dated Nov. 26, 2014 3 pages.
Official Action for United Kingdom Patent Application No. GB1423093.2, dated Jan. 26, 2015 5 pages.
Notice of Allowance for United Kingdom Patent Application No. GB1311098.6, dated Apr. 21, 2015 2 pages.

* cited by examiner

HIGH AVAILABILITY SESSION RECONSTRUCTION

TECHNICAL FIELD

The system and method relates to failover systems and in particular to failover systems to reconstruct an existing session.

BACKGROUND

With today's highly distributed communication systems, customers demand that the communication systems just work. To deal with this demand, communication providers build in redundancy in their networks to preserve communications when a network element fails. As new protocols evolve, such as the Session Initiation Protocol (SIP), providing redundant communication systems that will provide failover for already established communications can be, at times, challenging.

In cases where an existing communication session is established or is in the process of being initiated, trying to maintain the state of the existing communication session on a failed over system can be difficult. This can be due to various factors such as protocol requirements. For example, trying to redirect an existing SIP communication session to a failover system typically will be rejected by the failover system. This is due to the failover system not being able to recognize that the redirected communication is for an existing communication session.

SUMMARY

Embodiments of the present disclosure are directed to solving these and other problems and disadvantages of the prior art. A first message is received at a primary container where the primary container is replicated by a secondary container. The first message is an initial message to initiate a first session. The first message is processed by an application in the primary container. At a point in time, the primary container is unavailable and the system and method detect that the primary container is unavailable. A second message is received by a front-end processor. The second message is associated with the first session. The second message is modified by moving at least a portion of a header in the second message into a different header in the second message and adding an additional header to the second message in response to the primary container being unavailable.

In another embodiment, the first, the second, and the modified messages are Session Initiation Protocol (SIP) messages and the first session is a communication established using SIP.

In another alternative, modifying the second message further comprises changing a SIP To field in the second message.

In another alternative, the modified second SIP message is sent to the secondary container. The modified second SIP message is received at the secondary container. In response to receiving the modified second SIP message at the secondary container, the second SIP message is encapsulated into a new SIP INVITE message. The new SIP INVITE message is sent to an application in the secondary container. The application in the secondary container is a replicated version of the application in the primary container.

In another embodiment, encapsulating the second SIP message into the new SIP INVITE is based on the modified second SIP message having the changed SIP To field.

In yet another alternative, the new SIP INVITE message is received at the application in the secondary container. It is determined that the new SIP INVITE message is actually an in-dialog message for the first SIP session. A new in-dialog message is reconstructed for the first SIP session.

In another embodiment, it is determined that the new SIP INVITE message is actually an in-dialog message for the first SIP session. This is accomplished by reviewing at least one of the different header and the additional header in the new SIP INVITE message.

In another alternative, reconstructing the new dialog message is accomplished by creating new reconstructed To and From tags in the new in-dialog message for the first SIP session.

In yet another alternative, mapping any subsequent SIP messages associated with the first SIP session is based on the newly reconstructed To and/or From tags.

In another embodiment, the modified second SIP message is encapsulated into a new SIP INVITE message. The new SIP INVITE message is sent to the secondary container. The new SIP INVITE message is received at the secondary container. The new SIP INVITE message is sent to an application in the secondary container. The application in the secondary container is a replicated version of the application in the primary container.

In yet another alternative, the new SIP INVITE message is received at the application in the secondary container. It is determined that the new SIP INVITE message is actually an in-dialog message for the first SIP session. The new SIP INVITE message is processed as the in-dialog message for the first SIP session.

In another embodiment the second SIP message is at least one of: an ACK request to a 2xx INVITE response, an ACK request for a 3xx-6xx INVITE response, an in-dialog INVITE request, an in-dialog non-INVITE request, a provisional response, a 2xx response to INVITE, a 3xx-6xx response to INVITE, a final response to a non-INVITE request, a final response to an in-dialog non-INVITE, a response of any kind in the failover group that is not associated with the session manager 110 that received the response, and a request of any kind that is not associated with the session manager 110 that received the response.

In another alternative, the primary container and the secondary container are JSR-289 containers.

In another embodiment, a primary container is configured to receive a first message. The first message is an initial message to initiate a first session. At least a portion of the primary container is replicated in a secondary container. An application in the primary container is configured to process the first message. A front end-processor is configured to detect that the primary container is unavailable, receive a second message associated with the first session, modify the second message by moving at least a portion of a header in the second message into a different header in the second message and add an additional header to the second message in response to the primary container being unavailable.

In yet another alternative, the first message is a first Session Initiation Protocol (SIP) message, the second message is a second SIP message, the modified second message is a modified second SIP message, and the first session is a first SIP session. The front-end processor is further configured to modify the second message by changing a SIP To field in the second message and send the modified second SIP message to the secondary container. A message processor in the secondary container is configured to receive the modified second SIP message, encapsulate the second SIP message into a new SIP INVITE message in response to receiving the modified second SIP message, and send the new SIP INVITE message to an application in the secondary container. The application in the secondary container is a replicated version of the application in the primary container.

In another alternative, the message processor encapsulates the second SIP message into the new SIP INVITE based on the modified second SIP message having the changed SIP To field.

In another embodiment, the application in the secondary container is configured to receive the new SIP INVITE message, determine that the new SIP INVITE message is actually an in-dialog message for the first SIP session, and reconstruct a new in-dialog message for the first SIP session. The application in the secondary container determines that the new SIP INVITE message is actually an in-dialog message for the first SIP session by reviewing at least one of the different header or the additional header in the new SIP INVITE message.

In another embodiment reconstructing the new dialog message is accomplished by creating new reconstructed To and From tags in the new in-dialog message for the first SIP session.

In yet another alternative, the message processor is further configured to map any subsequent SIP messages associated with the first SIP session based on the new reconstructed To and From tags.

Another embodiment describes computer readable medium having stored thereon non-transitory instructions that cause a processor to execute a method, the method comprising: instructions to receive, at a primary container, a first SIP message, wherein the first SIP message is an initial SIP message to initiate a first SIP session and at least a portion of the primary container is replicated in a secondary container; instructions to process the first SIP message in an application in the primary container; instructions to detect that the primary container is unavailable; instructions to receive a second SIP message, wherein the second SIP message is associated with the first SIP session; and instructions to modify the second SIP message by moving at least a portion of a header in the second SIP message into a different header in the second SIP message and add an additional header to the second SIP message.

In another alternative a new SIP INVITE is created that comprises a correlation identifier which identifies the first SIP session in the primary container. The new SIP INVITE does not have the SIP To tag. The new SIP INVITE is sent to the secondary container. The new SIP INVITE is received at an application in the secondary container. The state of the application in the secondary container is restored based on the correlation identifier. A 200 OK is sent to reestablish the first SIP session. A dialog identifier is changed that identifies the reestablished first SIP session in the second message. The second message is sent to the application in the secondary container.

In one embodiment the 200 OK is sent from the application in the secondary container. In another embodiment, the 200 OK is sent by a communication device. In another embodiment, the dialog identifier is mapped for any subsequent messages for the reestablished first SIP session.

DETAILED DESCRIPTION

Figure 1:
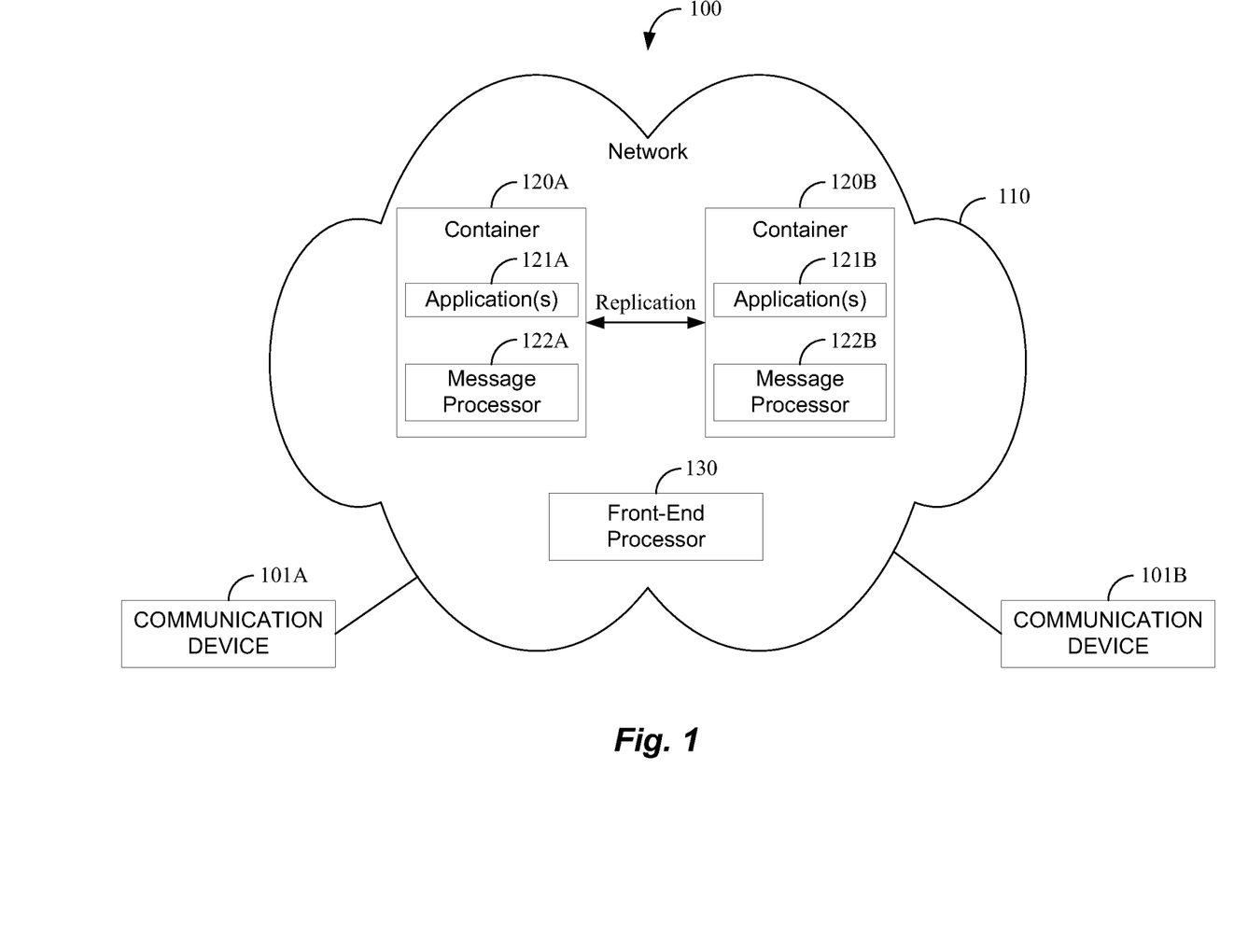
FIG. 1 is a block diagram of a first illustrative system for facilitating a communication session.

FIG. 1 is a block diagram of a first illustrative system 100 for facilitating a communication session. The first illustrative system 100 comprises communication devices 101A-101B, network 110, containers 120A-120B, and front-end processor 130.

Communication devices 101A-101B can be any type of communication device that can communicate with container 120A, container 120B, and/or front-end processor 130. For example, communication devices 101A-101B can be a telephone, a video phone, a Personal Computer (PC), a tablet device, a cellular telephone, a Personal Digital Assistant (PDA), an H.323 device, a Session Initiation Protocol (SIP) device, an Instant Messaging (IM) device, various combinations of these, and the like. Although communication devices 101A-101B are shown connected to network 110, communication devices 101A-101B can be directly connected to front-end processor 130 and/or containers 120A-120B. FIG. 1 shows two communication devices 101A-101B. However, FIG. 1 can comprise any number of additional communication devices 101.

Network 110 can be any network that can send and receive data, such as the Internet, a Wide Area Network (WAN), a Local Area Network (LAN), the Public Switched Telephone Network (PSTN), a packet switched network, a circuit switched network, a cellular network, a corporate network, a combination of these, and the like. Network 110 can use a variety of protocols, such as Ethernet, Internet Protocol (IP), Session Initiation Protocol (SIP), Integrated Services Digital Network (ISDN), H.323, and the like.

Containers 120A-120B can be any hardware/software that can run a process. For example, containers 120A-120B can be a container running under Linux, a container running under Windows®, a Java Specification Request (JSR) 289 container, and the like. Containers 120A-120B may be a virtualized or non-virtualized container. Containers 120A-120B may be an operating system-level virtualization that provides multiple containers running on the same server. FIG. 1 shows two containers 120A-120B. However, the first illustrative system 100 may comprise more than two containers 120. Containers 120A-120B can run on a single device or on multiple devices, such as a server, a Private Branch Exchange (PBX), a communication system, a switch, a session manager, and the like. Containers 120A-120B can run on a variety of operating systems, such as Unix, Linux, Windows®, Android, a multitasking operating system, a non-multitasking operating system, an embedded operating system, and/or the like.

Containers 120A-120B further comprise application(s) 121 and message processor 122. Application(s) 121 can be any application that interact with electronic communications, such as a voice recording application, a video conferencing application, a voice conferencing application, a call mixer, a call forwarding application, a call forking application, a call hold application, an Instant Message recording application, and/or the like. Message processor 122 can be any hardware/software that can process messages. Message processor 122 may process a variety of messages, such as TCP/IP packets, UDP packets, SIP messages, H.323 messages, Real Time Protocol (RTP) messages, and/or the like.

Front-end processor 130 can be any hardware/software that can process messages such as a server, a router, a communication device 101, a process running in a separate container, a dedicated device, and/or the like. Front-end processor 130 can process a variety of messages, such as TCP/IP packets, UDP packets, SIP messages, H.323 messages, Real Time Protocol (RTP) messages, and/or the like. Front-end processor 130 can be distributed across various servers and devices.

A first message is received at container 120A. The first message can be sent from communication device 101A or 101B either directly or via front-end processor 130. The first message is an initial message to initiate a first session. For example, the first message may be a SIP INVITE (i.e., to initiate a video session, an audio session, or an IM session) to establish a SIP session from communication device 101A to communication device 101B. The message to initiate the first session may use a variety of protocols, such as File Transfer Protocol (FTP), H.323, video protocols, SIP, TCP/IP, and/or the like.

Container 120A is a primary container. Container 120B is a secondary container. At least a portion of the state of the sessions in container 120A is replicated in container 120B.

The first message is processed in application 121A. In this example, the first message is processed in a single application 121A. However, the first message can be processed in a number of applications 121 in container 120A. The first message is sent to one of the communication devices 101A-101B.

Front-end processor 130 detects that container 120A is unavailable. Container 120A can be unavailable for a variety of reasons, such as a failure in network 110, a server failure, the process for container 120A has been killed, a device running container 120 has failed, a router failure, a cable failure, and/or the like.

Front-end processor 130 receives a second message that is associated with the first session. In response to container 120A being unavailable, front-end processor 130 modifies the second message by moving at least a portion of a header in the second message into a different header in the second message. Front end processor 130 also adds a header to the second message. If the protocol is SIP, the added header in the second message may be either a SIP To and/or a SIP From field.

In another embodiment, where SIP is used, the first, the second, and the modified messages are SIP messages. In one embodiment, containers 120A-120B are JSR-289 containers. In addition, where SIP is the protocol used, the SIP To field can be changed. This can be accomplished in various ways, such as deleting the SIP To field, zeroing out the SIP To field, replacing the SIP to field with a defined value, changing the size of the SIP To field, and the like.

If the SIP protocol is used, the second SIP message can be a variety of different SIP messages. For example, the second SIP message may be an ACK request to a 2xx INVITE response (where 2xx indicates the SIP number), an ACK request for a 3xx-6xx INVITE response, an in-dialog INVITE request, an in-dialog non-INVITE request, a provisional response, a 2xx response to INVITE, a 3xx-6xx response to INVITE, a final response to a non-INVITE request, a final response to an in-dialog non-INVITE, a response of any kind in the failover group that is not associated with the session manager 110 that received the response, and a request of any kind that is not associated with the session manager 110 that received the response.

An in-dialog message such as an in-dialog SIP Invite can be used to establish a new media stream within an existing communication session. For example, an in-dialog SIP INVITE can be used to create a second SIP communication (e.g., a SIP IM session within a SIP voice session). An out of-dialog message would be the SIP messages to create the original SIP communication session.

In an illustrative example, where SIP is used, the modified second message is a SIP message. The modified second SIP message is sent from front-end processor 130 to container 120B. This is because front-end processor 130 has detected that container 120A is not available. Container 120B receives the modified second SIP message. In response to receiving the modified second SIP message, message processor 122B encapsulates the second SIP message into a new SIP INVITE message. The new SIP INVITE message is associated with a session different from the first SIP session. Message processor 122B can determine that the second SIP message is a modified SIP message based on the modified SIP message having the changed SIP TO field, based on the added header, based on the different header and/or any combination of these.

Message processor 122B sends the new SIP INVITE message to application 121B. Application 121B is a replicated version of application 121A in container 120A. Application 121B receives the new SIP INVITE message. Application 121B determines that the new SIP INVITE message actually contains an in-dialog message for the first SIP session. This can be accomplished by application 121B reviewing the different and/or the additional header. For example, application 121B can look for the additional header as indicator that the message is actually an in-dialog message. Information in the additional field can then be used to identify the first SIP session. Since the information in container 120A is replicated in container 120B. Application 121B will be able to use the information in the additional field to identify the first session that was initiated in container 120A.

Application 121B reconstructs a new in-dialog message for the first SIP session. The reconstruction of the new in-dialog message can be accomplished in various ways. For example, application 121B can reconstruct the new in-dialog message by creating new To and From tags in the new in-dialog message for the first SIP session. The new To and From tags match those of the first SIP session (which application 121B will know from receiving the replicated information form application 121A). This way, application 121B can use the new in-dialog message as though the first SIP session was initiated in container 120B (even thought the first SIP session actually was initiated in container 120A). Based on the new To and From tags, any subsequent SIP messages associated with the first Session can be mapped to the first SIP session by using the same To and From tags.

The reconstructed new in-dialog messages may then sent to other applications 121B in container 120B. The other applications 121B (if other applications 121B exist or have registered for the first SIP session) in container 120B can then process the new in-dialog messages. After being processed by any additional applications 121B, the new in-dialog message will then be sent to the other end of the communication session. For example, if the second message is from communication device 101A and the first SIP session is between communication device 101A and 101B, the new in-dialog message will be sent to communication device 101B.

In another embodiment, encapsulating the modified second SIP message into the new SIP INVITE is accomplished by front-end processor 130. Front-end processor 130 sends the new SIP INVITE to container 120B. The new SIP invite is received at container 120B. Message processor 122B sends the new SIP INVITE message to application 121B. Application 121B receives the new SIP INVITE message.

Application 121B determines that the new SIP INVITE message is actually an in-dialog message for the first SIP session. Application 121B reconstructs a new in-dialog message for the first SIP session using a similar process as described above.

In an alternative embodiment, where SIP is used, the modified second message is a SIP message. Front end processor 130 creates a new SIP INVITE that comprises a correlation identifier which identifies the first SIP session in container 120A. The new SIP INVITE does not have a To tag. Front end processor 130 sends the new SIP INVITE to application 121B. Application 121B restores its state based on the correlation identifier. A 200 OK is sent to reestablish the first communication session. Front end processor 130 inserts a dialog identifier that identifies the reestablished session in the second message. The second message is then sent to application 121B. Application 121B can process and forward the second message to communication device 101B (i.e., if application 121B is a B2B UA). Front end processor 130 can then map any subsequent SIP messages using the dialog identifier.

In one embodiment, where application 121B is a named application (i.e., a voice mail application), application 121B sends the 200 OK message. In an alternative embodiment where application 121B is a Back-to-Back UA, the 200OK will be sent by communication device 101B.

In another alternative, the second message can be sent in the new SIP INVITE.

Many of the above processes have been described using the SIP protocol. However, as one of skill in the art would realize, the above processes are not specific to SIP and can also be implemented using other protocols such as H.323, FTP, video protocols, and/or the like.

Figure 2:
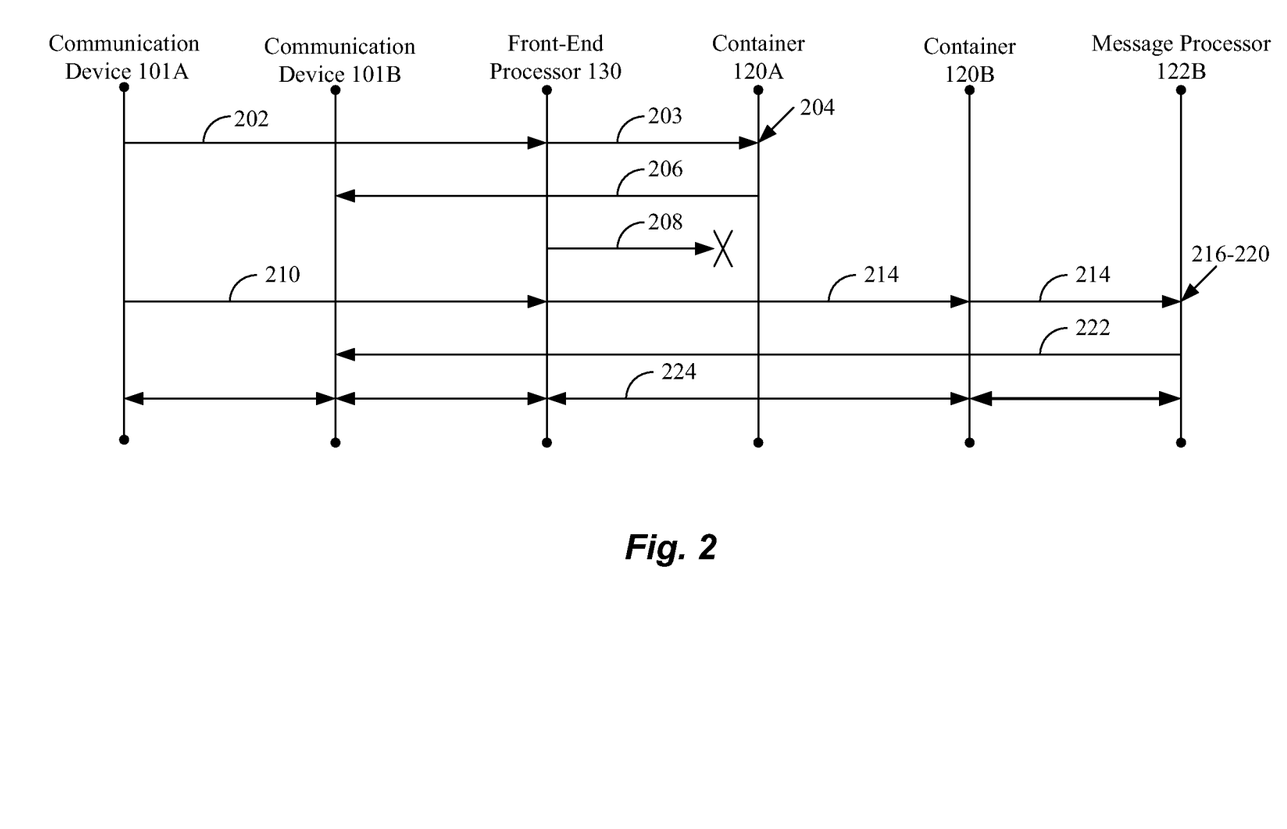
FIG. 2 is a flow diagram of a method for facilitating a communication session.
Figure 3:
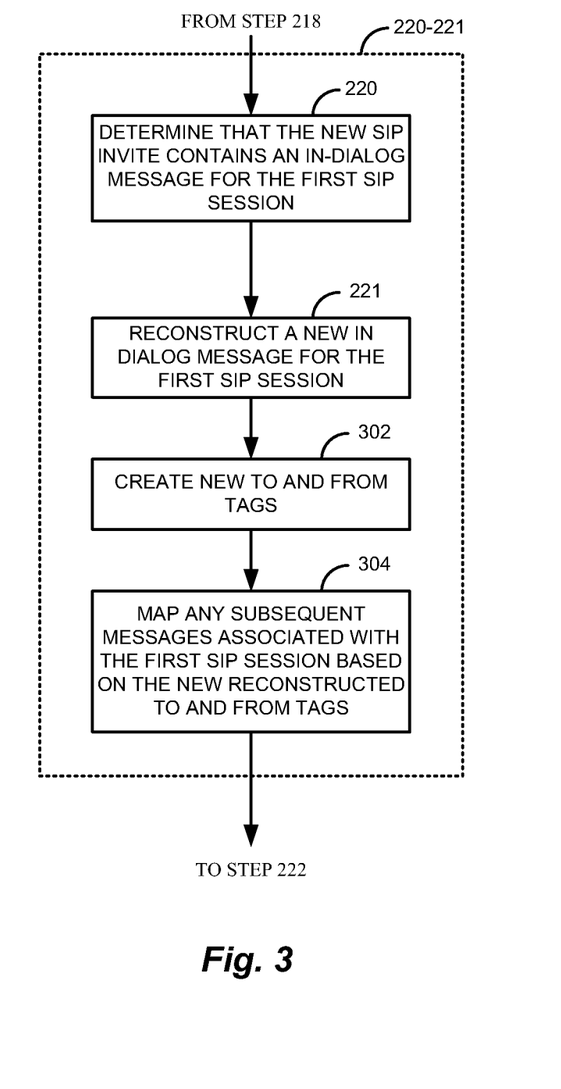
FIG. 3 is a flow diagram of a method for reconstructing a new in-dialog message.
Figure 4:
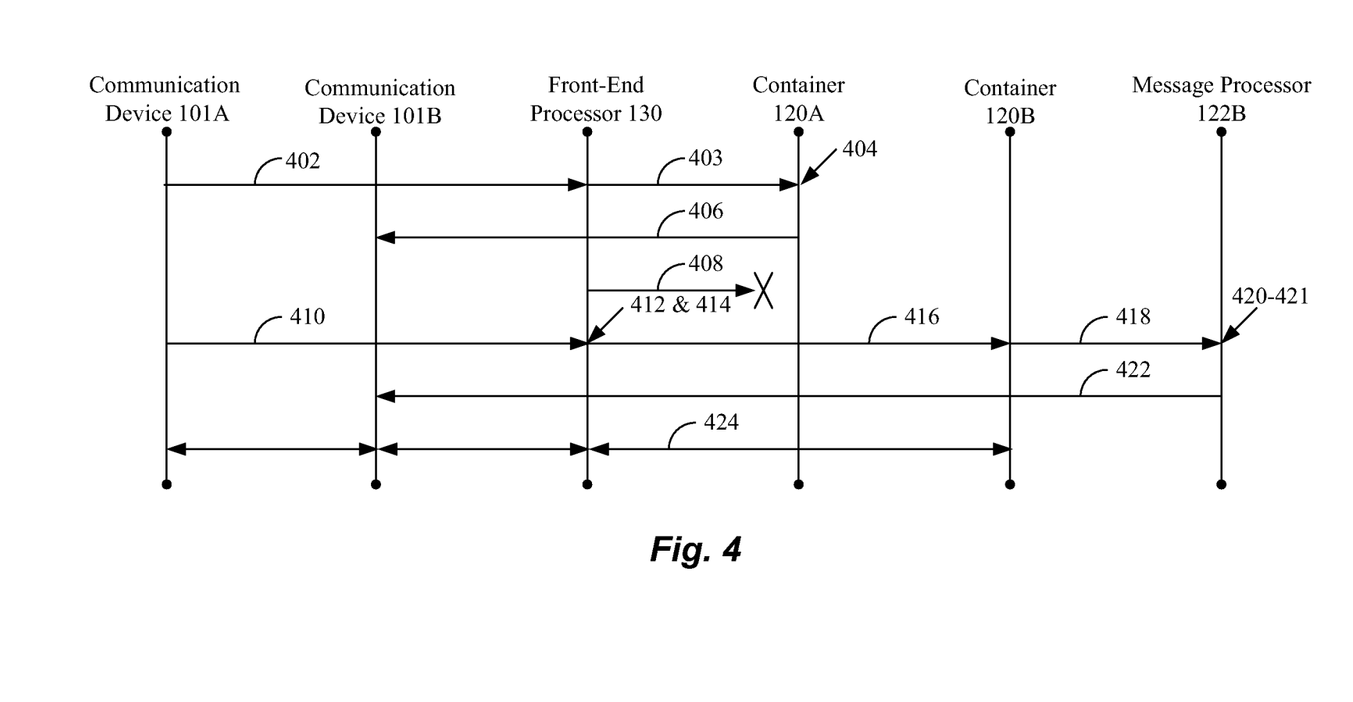
FIG. 4 is a flow diagram of a method for facilitating a communication session.

FIG. 2 is a flow diagram of a method for facilitating a communication session. Illustratively, communication devices 101A-101B, containers 120A-120B, applications 121A-121B, message processors 122A-122B, and front-end processor 130 are stored-program-controlled entities, such as a computer or processor, which performs the method of FIGS. 2-6 and the processes described herein by executing program instructions stored in a non-transient computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation A first message is sent 202 from communication device 101A. The first message is sent via front-end processor 130. The first message is received 203 at container 120A. The first message is an initial message to initiate a first session. In this embodiment, container 120A is a primary container and container 120B is a secondary container. At least a portion of the state of the sessions in container 120A is replicated in container 120B.

The first message is processed 204 in application 121A. The first message is sent 206 to communication device 101B. For example, if the first message is a SIP INVITE, the SIP invite is sent 206 to communication device 101B.

Front-end processor 130 detects 208 that container 120A is unavailable. Front-end processor 130 can detect that container 120A is unavailable in a variety of ways, such as by periodically sending a message to container 120A and waiting for a response back from container 120A. In an alternative process, container 120A can periodically send a message to front-end processor 130.

Communication device 101A sends 210 a second message associated with the first session (however, in an alternative embodiment, the second message can be from communication device 101B). Front-end processor 130 receives 210 the second message that is associated with the first session. In response to container 120A being unavailable, front-end processor 130 modifies 212 the second message by moving at least a portion of a header in the second message into a different header in the second message and adding a header to the second message.

In another embodiment, where SIP is used, the first, the second, and the modified messages are SIP messages. In addition, a SIP To field is changed. The modified second message SIP is sent 214 from front-end processor 130 to container 120B. This is because front-end processor 130 has detected that container 120A is not available. Container 120B receives 214 the modified second SIP message. In response to receiving the modified second SIP message, message processor 122B encapsulates 216 the second SIP message into a new SIP INVITE message. Message processor 122B can determine that the second SIP message is a modified SIP message based on the modified SIP message having the changed SIP TO field, based on the added header, based on the different header and/or any combination of these. Message processor 122B sends 218 the new SIP INVITE message to Application 121B.

Application 121B receives 218 the new SIP INVITE message. Application 121B determines 220 that the new SIP INVITE message actually contains an in-dialog message for the first SIP session. This can be accomplished by message processor 122B reviewing the different and/or the additional header. For example, message processor 122B can look for the additional header as indicator that the message is actually an in-dialog message. The additional field can then be used to identify the actual SIP session. Since the information in container 120A is replicated in container 120B. Message processor 122B will be able to use the information in the additional field to identify the actual session that was initiated in container 120A. Message processor 122B reconstructs 221 a new in-dialog message for the first SIP session. The new in-dialog message is sent to application 121*b* for processing and is then sent 222 to communication device 101B. The SIP session can then proceed in step 224 as subsequent messages for the first SIP session are passed between communication devices 101A-101B, container 120B, and application 121B.

Many of the above processes have been described using the SIP protocol. However, as one of skill in the art would realize, many the above processes are not specific to SIP and can also be implemented using other protocols such as H.323, FTP, video protocols, and/or the like.

FIG. 3 is a flow diagram of a method for reconstructing a new in-dialog message. FIG. 3 is an expanded view of steps 220-221 in FIG. 2. Message processor 122B determines 220 that the new SIP INVITE message is actually an in-dialog message for the first SIP session. Message processor 122B reconstructs 221 a new in-dialog message for the first SIP session. The reconstruction of the new in-dialog message can be accomplished in various ways. For example, message processor 122B can reconstruct the new in-dialog message by creating 302 new To and/or From tags in the new in-dialog message for the first SIP session. The new To and From tags match those of the first SIP session. This way, message processor 122B can use the new in-dialog message as though the first SIP session was imitated in container 120B (even thought the first SIP session actually was initiated in container 120A).

Based on the new To and From tags, any subsequent SIP messages associated with the first SIP session can be mapped 304 to the first SIP session. In one embodiment, this is accomplished by replacing a subsequent message for the first SIP session with the same To and From tags. The process then goes to step 222.

FIG. 4 is a flow diagram of a method for facilitating a communication session. A first message is sent 402 from communication device 101A. The first message is sent via front-end processor 130. The first message is received 403 at container 120A. The first message is an initial message to initiate a first session. In this embodiment, container 120A is a primary container and container 120B is a secondary container. At least a portion of the state of the sessions in container 120A is replicated in container 120B.

The first message is processed 404 in application 121A. The first message is sent 406 to communication device 101B. Front-end processor 130 detects 408 that container 120A is unavailable. Communication device 101A sends 410 a second message associated with the first session (however, in an alternative, the second message can be from communication device 101B). Front-end processor 130 receives 410 the second message that is associated with the first session. In response to container 120A being unavailable, front-end processor 130 modifies 412 the second message by moving at least a portion of a header in the second message into a different header in the second message and adding a header to the second message.

Front-end processor 130 encapsulates 414 the modified second SIP message into the new SIP INVITE. Front-end processor 130 sends 416 the new SIP INVITE to container 120B. The new SIP invite is received at container 120B. Container 120B sends 418 the new SIP INVITE message to message processor 122B. Message processor 122B receives the new SIP INVITE message. Message processor 122B determines 420 that the new SIP INVITE message is actually an in-dialog message for the first SIP session. Message processor 122B reconstructs 421 a new in-dialog message for the first SIP session. The new in-dialog message for the first SIP session is sent to application 121B for processing and is then sent 422 to communication device 101B. The SIP session can then proceed in step 424 as subsequent messages for the first SIP session are passed between communication devices 101A-101B, container 120B, and application 121B.

Figure 5:
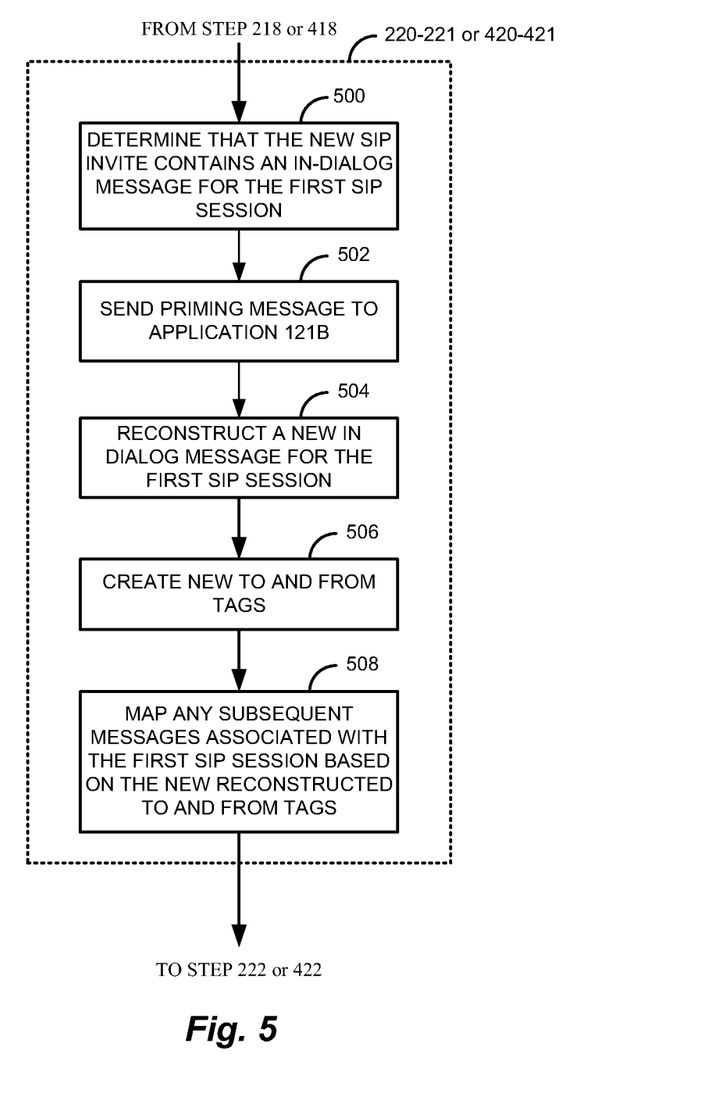
FIG. 5 is a flow diagram of a method for reconstructing a new in-dialog message.

FIG. 5 is a flow diagram of a method for reconstructing a new in-dialog message. FIG. 5 is an expanded view of steps 220-221 or steps 420-421 in FIG. 2 or FIG. 4. Message processor 122B determines 500 that the new SIP INVITE message is actually an in-dialog message for the first SIP session. Message processor 122B sends 502 a priming message to application 121B. The priming message can be the new SIP invite (the new SIP invite is forwarded). The priming message is sent to a second message processor 122 (not shown) that processes the priming message. The second message processor 122 responds with a 200 OK to indicate that message processor 122B can send a new in-dialog message for the first SIP session. Message processor 122B reconstructs 504 a new in-dialog message for the first SIP session. The reconstruction of the new in-dialog message can be accomplished in various ways. For example, message processor 122B can reconstruct the new in-dialog message by creating 506 new To and/or From tags in the new in-dialog message for the first SIP session. The new To and From tags match those of the first SIP session. This way, message processor 122B can use the new in-dialog message as though the first SIP session was imitated in container 120B (even thought the first SIP session actually was initiated in container 120A).

Based on the new To and From tags, any subsequent SIP messages associated with the first SIP session can be mapped 508 to the first SIP session. In one embodiment, this is accomplished by replacing a subsequent message for the first SIP session with the same To and From tags. The process then goes to step 222 or 422.

Figure 6:
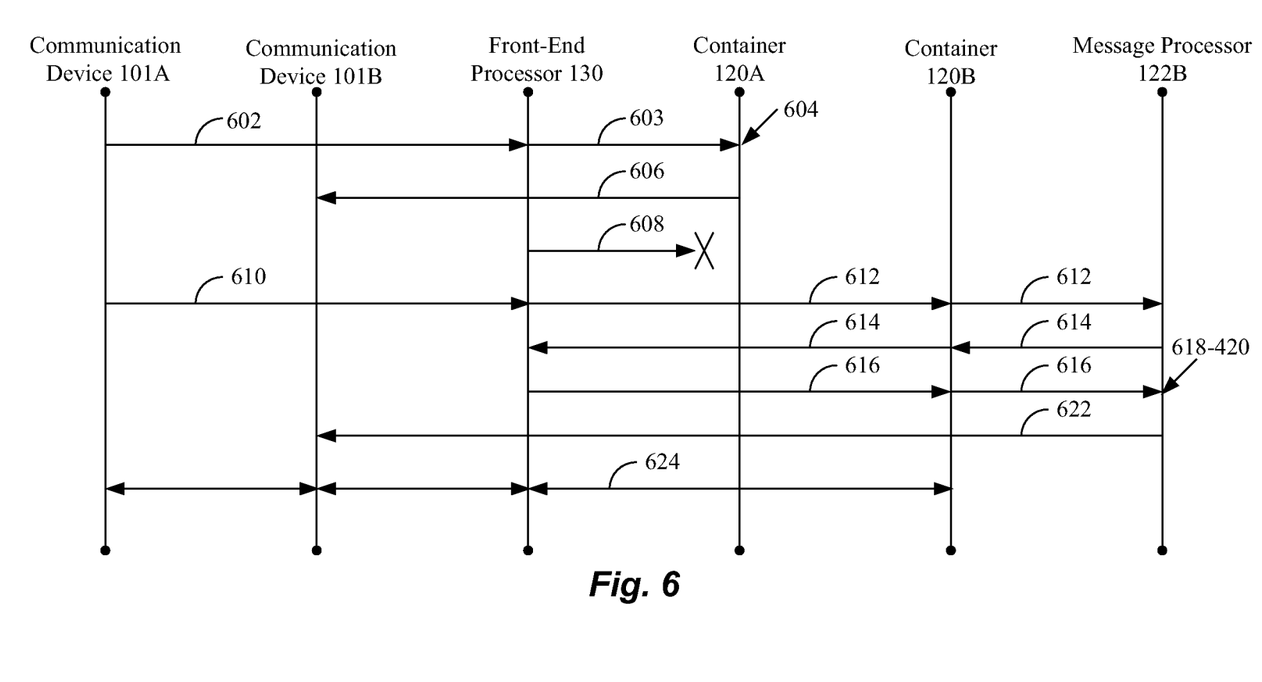
FIG. 6 is a flow diagram of a method for facilitating a communication session.

FIG. 6 is a flow diagram of a method for facilitating a communication session. A first message is sent 602 from communication device 101A. The first message is sent via front-end processor 130. The first message is received 603 at container 120A. The first message is an initial message to initiate a first session. In this embodiment, container 120A is a primary container and container 120B is a secondary container. At least a portion of the state of the sessions in container 120A is replicated in container 120B.

The first message is processed 604 in application 121A. The first message is sent 606 to communication device 101B. Front-end processor 130 detects 608 that container 120A is unavailable. Communication device 101A sends 610 a second message associated with the first session (however, in an alternative, the second message can be from communication device 101B). Front-end processor 130 receives 610 the second message that is associated with the first session. In response to container 120A being unavailable, front-end processor 130 sends 612 a SIP PUBLISH message to message processor 122B via container 120B. The SIP PUBLISH message is a request to message processor 122B asking message processor 122B how front-end processor 130 should respond. In response to the SIP PUBLISH message, Message processor 122B can send different response messages. For example, message processor 122B can send 614 a response that indicates to front-end processor 130 to send the new SIP INVITE message. Alternatively, message processor may respond by sending 614 a request to send an in-dialog message with a reconstructed To and/or From tags.

Front-end processor 130 responds to the response message from message processor 122B by sending 616 the appropriate message. For example, by sending the new SIP INVITE or the in-dialog message with the reconstructed To and/or From tags. Message processor 122B receives 616 the message sent by front-end processor 130. If the message is a new SIP INVITE, message processor 122B determines 618 that the new SIP INVITE message is actually an in-dialog message for the first SIP session. Message processor 122B reconstructs 620 a new in-dialog message for the first SIP session. The new in-dialog message for the first SIP session is sent to application 121B for processing and is then sent 622 to communication device 101B. The SIP session can then proceed in step 624 as subsequent messages for the first SIP session are passed between communication devices 101A-101B, container 120B, and application 121B.

If the message that is sent in step 616 is an in-dialog message with the reconstructed To and/or From tags, the in-dialog message with the reconstructed To and/or From tags is sent to application 121B for processing. The message is then sent 622 to communication device 101B. The SIP session can then proceed in step 624 as subsequent messages for the first SIP session are passed between communication devices 101A-101B, container 120B, and application 121B.

In another embodiment, encapsulating the modified second SIP message into the new SIP INVITE is accomplished by front-end processor 130. Front-end processor 130 sends the new SIP INVITE to container 120B. The new SIP invite is received at container 120B. Message processor 122B sends the new SIP INVITE message to application 121B. Application 121B receives the new SIP INVITE message.

Application 121B determines that the new SIP INVITE message is actually an in-dialog message for the first SIP session. Application 121B reconstructs a new in-dialog message for the first SIP session using a similar process as described above.

A first message is sent 202 from communication device 101A. The first message is sent via front-end processor 130. The first message is received 203 at container 120A. The first message is an initial message to initiate a first session. In this embodiment, container 120A is a primary container and container 120B is a secondary container. At least a portion of the state of the sessions in container 120A is replicated in container 120B.

The first message is processed 204 in application 121A. The first message is sent 206 to communication device 101B. For example, if the first message is a SIP INVITE, the SIP invite is sent 206 to communication device 101B.

Front-end processor 130 detects 208 that container 120A is unavailable. Front-end processor 130 can detect that container 120A is unavailable in a variety of ways, such as by periodically sending a message to container 120A and waiting for a response back from container 120A. In an alternative process, container 120A can periodically send a message to front-end processor 130.

Communication device 101A sends 210 a second message associated with the first session (however, in an alternative embodiment, the second message can be from communication device 101B). Front-end processor 130 receives 210 the second message that is associated with the first session. In response to container 120A being unavailable, front-end processor 130 modifies 212 the second message by moving at least a portion of a header in the second message into a different header in the second message and adding a header to the second message.

Figure 7:
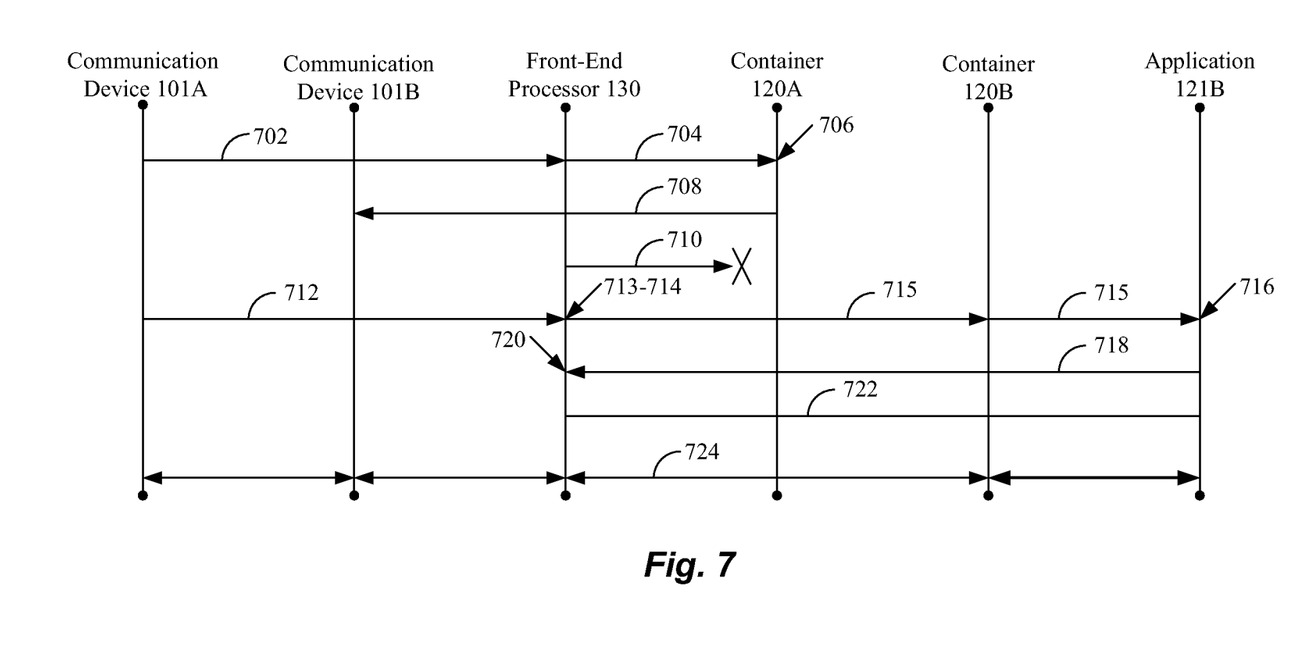
FIG. 7 is a flow diagram of a method for facilitating a communication session.

FIG. 7 is a flow diagram of a method for facilitating a communication session. A first message is sent 702 from communication device 101A. The first message is sent via front-end processor 130. The first message is received 704 at container 120A. The first message is an initial message to initiate a first session. In this embodiment, container 120A is a primary container and container 120B is a secondary container. At least a portion of the state of the sessions in container 120A is replicated in container 120B.

The first message is processed 706 in application 121A. The first message is sent 708 to communication device 101B. For example, if the first message is a SIP INVITE, the SIP invite is sent 206 to communication device 101B.

Front-end processor 130 detects 710 that container 120A is unavailable. Front-end processor 130 can detect that container 120A is unavailable in a variety of ways, such as by periodically sending a message to container 120A and waiting for a response back from container 120A. In an alternative process, container 120A can periodically send a message to front-end processor 130.

Communication device 101A sends 712 a second message associated with the first session (however, in an alternative embodiment, the second message can be from communication device 101B). Front-end processor 130 receives 712 the second message that is associated with the first session.

In response to container 120A being unavailable, front end processor 130 creates 714 a new SIP INVITE that comprises a correlation identifier which identifies the first SIP session in the container 120A. The new SIP INVITE does not have a To tag. Front end processor 130 sends 715 the new SIP INVITE to application 121B. Application 121B restores 716 its state based on the correlation identifier. A 200 OK is sent 718 to reestablish the first communication session. The 200 OK may be sent 718 from Application 121B or may be sent from front end processor 130 after the new SIP INVITE exits the container (if application 121B is B2B UA). Front end processor 130 changes 720 the dialog identifier (comprised by the Call-ID, From tag and To tag) in the second message to match that of the reestablished session. The second message is then sent 722 to application 121. Front end processor 130 can then map any subsequent SIP messages using the dialog identifier that are sent during the session 724.

Although the processes described for step 713-724 are shown implemented in front end processor 130 and application 121B, the steps may implemented across different elements of FIG. 1. For example, steps that are implemented in front end processor 130 may be implemented in message processor 122 instead.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, via a network, at a primary container being executed by a hardware processor, a first message, wherein the first message is an initial message to initiate a first communication session between a first communication device and a second communication device and wherein at least a portion of the primary container is replicated in a secondary container;
   processing, by the hardware processor, the first message in an application of the primary container;
   detecting, by a front end processor being executed by the hardware processor, that the primary container is unavailable, wherein the front end processor, is a hardware processor;
   receiving, via the network and by the front end processor being executed by the hardware processor, a second message from the first communication device or second communication device, wherein the second message is associated with the first communication session; and
   responsive to the primary container being unavailable, modifying, by the front end processor being executed by the hardware processor, the second message by moving at least a portion of a header in the second message into a different header in the second message and adding an additional header to the second message.

2. The method of claim 1, wherein the first message is a first Session Initiation Protocol (SIP) message, the second message is a second SIP message, the modified second message is a modified second SIP message, and the first communication session is a first SIP communication session.

3. The method of claim 2, wherein modifying the second message further comprises modifying a SIP To field in the second message.

4. The method of claim 3, further comprising the steps of:
   sending the modified second SIP message to a first message processor;
   receiving the modified second SIP message at the first message processor;

forwarding the modified SIP message to a second message processor;

sending a response to the forwarded modified SIP message to the first message processor;

receiving the response to the forwarded modified SIP message at the first message processor;

in response to receiving the forwarded modified SIP message at the first message processor, encapsulating the modified SIP message into a new SIP INVITE message; and sending the new SIP INVITE message to an application in the secondary container, wherein the application in the secondary container is a replicated version of the application in the primary container.

5. The method of claim 3, further comprising the steps of:

creating a new SIP INVITE that comprises a correlation identifier which identifies the first SIP communication session in the primary container and wherein the new SIP INVITE does not have the SIP To tag;

sending the new SIP INVITE to the secondary container;

receiving the new SIP INVITE at an application in the secondary container;

restoring a state of the application in the secondary container based on the correlation identifier;

sending a 200 OK to reestablish the first SIP communication session;

changes a dialog identifier that identifies the reestablished first SIP communication session in the second message; and sending the second message to the application in the secondary container.

6. The method of claim 5, wherein the 200 OK is sent from the application in the secondary container.

7. The method of claim 5, wherein the 200 OK is sent by the first communication device or the second communication device.

8. The method of claim 5, further comprising the step of embedding the second message into the new SIP INVITE.

9. The method of claim 5, further comprising the step of mapping the dialog identifier for any subsequent messages for the reestablished first SIP communication session.

10. The method of claim 2, wherein the second SIP message is at least one of: an ACK request to a 2xx INVITE response, an ACK request for a 3xx-6xx INVITE response, an in-dialog INVITE request, an in-dialog non-INVITE request, a provisional response, a 2xx response to INVITE, a 3xx-6xx response to INVITE, a final response to a non-INVITE request, a final response to an in-dialog non-INVITE, a response of any kind in the failover group that is not associated with the session manager 110 that received the response, or a request of any kind that is not associated with the session manager 110 that received the response.

11. The method of claim 1, wherein the primary container and the secondary container are JSR-289 containers.

12. A communication system comprising:

a primary container that receives a first message, via a network, wherein the first message is an initial message to initiate a first communication session between a first communication device and a second communication device and wherein at least a portion of the primary container is replicated in a secondary container;

an application in the primary container that processes the first message;

a front end-processor that detects that the primary container is unavailable, wherein the front end processor is a hardware processor, receives, via the network, a second message from the first or second communication device, wherein the second message is associated with the first communication session, modifies the second message by moving at least a portion of a header in the second message into a different header in the second message and adds an additional header to the second message in response to the primary container being unavailable.

13. The system of claim 12, wherein the first message is a first Session Initiation Protocol (SIP) message, the second message is a second SIP message, the modified second message is a modified second SIP message, and the first communication session is a first SIP session, and wherein:

the front-end processor modifies the second message by changing a SIP To field in the second message and sends the modified second SIP message to the secondary container; and a message processor in the secondary container receives the modified second SIP message, encapsulates the second SIP message into a new SIP INVITE message in response to receiving the modified second SIP message, and sends the new SIP INVITE message to an application in the secondary container, wherein the application in the secondary container is a replicated version of the application in the primary container.

14. The system of claim 12, wherein the first message is a first Session Initiation Protocol (SIP) message, the second message is a second SIP message, the modified second message is a modified second SIP message, and the first communication session is a first SIP communication session, and wherein:

the front end processor creates a new SIP INVITE that comprises a correlation identifier which identifies the first SIP communication session in the primary container and wherein the new SIP INVITE does not have the SIP To tag, sends the new SIP INVITE to the secondary container, change a dialog identifier that identifies the reestablished first SIP communication session in the second message, and sends the second message to the application in the secondary container; and an application in the secondary container that receives the new SIP INVITE, and restores a state of the application in the secondary container based on the correlation identifier.

15. The system of claim 14, wherein the application in the secondary container sends a 200 OK.

16. The system of claim 14, wherein a 200 OK is sent by the first communication device or the second communication device.

17. The system of claim 14, wherein the front end processor embeds the second message into the new SIP INVITE.

18. The system of claim 14, wherein the front end processor maps the dialog identifier for any subsequent messages for the reestablished first SIP communication session.

19. A computer readable medium, where the medium is not a signal, having stored thereon tangible and non-transitory instructions that comprising:

instructions to receive, via a network, at a primary container, a first Session Initiation Protocol (SIP) message, wherein the first SIP message is an initial SIP message to initiate a first SIP communication session between a first communication device and a second communication device and wherein at least a portion of the primary container is replicated in a secondary container;

instructions to process the first SIP message in an application in the primary container;

instructions to detect, by a front end processor, that the primary container is unavailable, wherein the front end processor is a hardware processor;

instructions to receive, via a network and by the front end processor, a second SIP message from the first communication device or the second communication device, wherein the second SIP message is associated with the first SIP communication session; and instructions to modify, by the front end processor, the second SIP message by moving at least a portion of a header in the second SIP message into a different header in the second SIP message and add an additional header to the second SIP message in response to the primary container being unavailable.

20. A method comprising:

receiving, via a network, at a primary container, a first Session Initiation Protocol (SIP) message, wherein the first SIP message is an initial message to initiate a first SIP communication session between a first communication device and a second communication device and wherein at least a portion of the primary container is replicated in a secondary container;

processing the first SIP message in an application in the primary container;

detecting, by a front end processor, that the primary container is unavailable, wherein the front end processor is a hardware processor;

receiving, via the network and by the front end processor, a second SIP message from the first communication device or the second communication device, wherein the second SIP message is associated with the first SIP communication session; and responsive to the primary container being unavailable, sending, via the network and by the front end processor, a SIP PUBLISH message to a message processor in the secondary container;

receiving, via the network and by the front end processor, a response to the SIP PUBLISH message;

in response to receiving the response to the SIP PUBLISH message, the front end processor doing one of the following:

i. modifying the second SIP message by moving at least a portion of a header in the second SIP message into a different header in the second SIP message and adding an additional header to the second SIP message; or ii. changing a SIP To field in the second SIP message.

\* \* \* \* \*